United States Patent
Wang

(10) Patent No.: US 8,812,705 B1
(45) Date of Patent: Aug. 19, 2014

(54) ACCESSING LOCATION-BASED CONTENT

(71) Applicant: Google Inc., Mountain View, CA (US)

(72) Inventor: Gang Wang, Frederick, MD (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/054,067

(22) Filed: Oct. 15, 2013

(51) Int. Cl.
*G06F 15/16* (2006.01)
*H04L 29/08* (2006.01)

(52) U.S. Cl.
CPC .................... *H04L 67/02* (2013.01)
USPC ......................................................... 709/229

(58) Field of Classification Search
CPC ............ H04L 29/08657; G06F 21/128; G06F 17/30861; G06F 9/45529
USPC ......................................................... 709/229
See application file for complete search history.

(56) References Cited

U.S. PATENT DOCUMENTS

| | | | | |
|---|---|---|---|---|
| 8,244,832 B1 * | 8/2012 | McGuire | ...................... | 709/218 |
| 8,429,180 B1 * | 4/2013 | Sobel et al. | .................... | 707/758 |
| 8,447,986 B2 * | 5/2013 | Weber et al. | .................... | 713/176 |
| 8,655,891 B2 * | 2/2014 | Ramer et al. | .................... | 707/748 |
| 2005/0055374 A1 * | 3/2005 | Sato | ............................ | 707/104.1 |
| 2008/0016055 A1 * | 1/2008 | Riise et al. | ......................... | 707/5 |
| 2009/0119580 A1 * | 5/2009 | Rohrabaugh et al. | ......... | 715/249 |
| 2009/0138427 A1 * | 5/2009 | Kalavade | .......................... | 707/1 |
| 2009/0217352 A1 * | 8/2009 | Shen et al. | ......................... | 726/3 |
| 2010/0023865 A1 * | 1/2010 | Fulker et al. | ................... | 715/734 |
| 2010/0082397 A1 | 4/2010 | Blegen | | |
| 2010/0331016 A1 | 12/2010 | Dutton et al. | | |
| 2012/0159356 A1 * | 6/2012 | Steelberg | ....................... | 715/760 |
| 2013/0054617 A1 * | 2/2013 | Colman | ....................... | 707/748 |
| 2013/0080219 A1 | 3/2013 | Royyuru et al. | | |
| 2013/0179544 A1 * | 7/2013 | Sainnsbury | ................... | 709/219 |

FOREIGN PATENT DOCUMENTS

WO    WO-2011/063833 A1    6/2011
WO    WO-2011/150388 A1    12/2011

OTHER PUBLICATIONS

Extended European Search Report on 13192791.5 dated May 14, 2014.

* cited by examiner

*Primary Examiner* — Krisna Lim
(74) *Attorney, Agent, or Firm* — Foley and Lardner LLP; John D. Lanza

(57) ABSTRACT

Systems and methods for accessing location-based content include retrieving, via a web browser, a list of one or more trusted online services. The retrieved list may be used to determine whether an online service from which content is to be requested. If so, the location of the requesting device may be provided to the service in conjunction with the content request.

20 Claims, 5 Drawing Sheets

ACCESSING LOCATION-BASED CONTENT

BACKGROUND

Online content may be received from various first-party or third-party sources. In general, first-party content refers to the primary online content requested or displayed by a user's device. For example, first-party content may be a webpage requested by the client or a stand-alone application (e.g., a video game, a chat program, etc.) running on the device. Third-party content, in contrast, refers to additional content that may be provided in conjunction with the first-party content. For example, third-party content may be a public service announcement or advertisement that appears in conjunction with a requested webpage (e.g., a search result webpage from a search engine, a webpage that includes an online article, a webpage of a social networking service, etc.) or within a stand-alone application (e.g., an advertisement within a game). More generally, a first-party content provider may be any content provider that allows another content provider (i.e., a third-party content provider) to provide content in conjunction with that of the first-party.

SUMMARY

Implementations of the systems and methods for accessing location-based content are disclosed herein. One implementation is a method of accessing location-based content. The method includes retrieving, by a web browser, a list of one or more trusted online services from a memory of a device. The method also includes receiving an instruction to access content available from an online service. The method further includes determining, by the web browser, that the online service associated with the instruction is in the list of one or more trusted online services. The method additionally includes requesting, by the web browser, the content from the online service. The method also includes sending, by the web browser, the location of the device to the online service in conjunction with the request for the content.

Another implementation is a system for accessing location-based content. The system includes one or more processors operable to retrieve, by a web browser, a list of one or more trusted online services from a memory of a device. The one or more processors are also operable to receive an instruction to access content available from an online service. The one or more processors are further operable to determine, by the web browser, that the online service associated with the instruction is in the list of one or more trusted online services. The one or more processors are additionally operable to request, by the web browser, the content from the online service. The one or more processors are also operable to send, by the web browser, the location of the device to the online service in conjunction with the request for the content.

A further implementation is a computer-readable storage medium having machine instructions stored therein that are executable by a processor to cause the processor to perform operations. The operations include retrieving, by a web browser, a list of one or more trusted online services from a memory of a device. The operations also include receiving an instruction to access content available from an online service. The operations further include determining, by the web browser, that the online service associated with the instruction is in the list of one or more trusted online services. The operations additionally include requesting, by the web browser, the content from the online service. The operations yet further include sending, by the web browser, the location of the device to the online service in conjunction with the request for the content.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
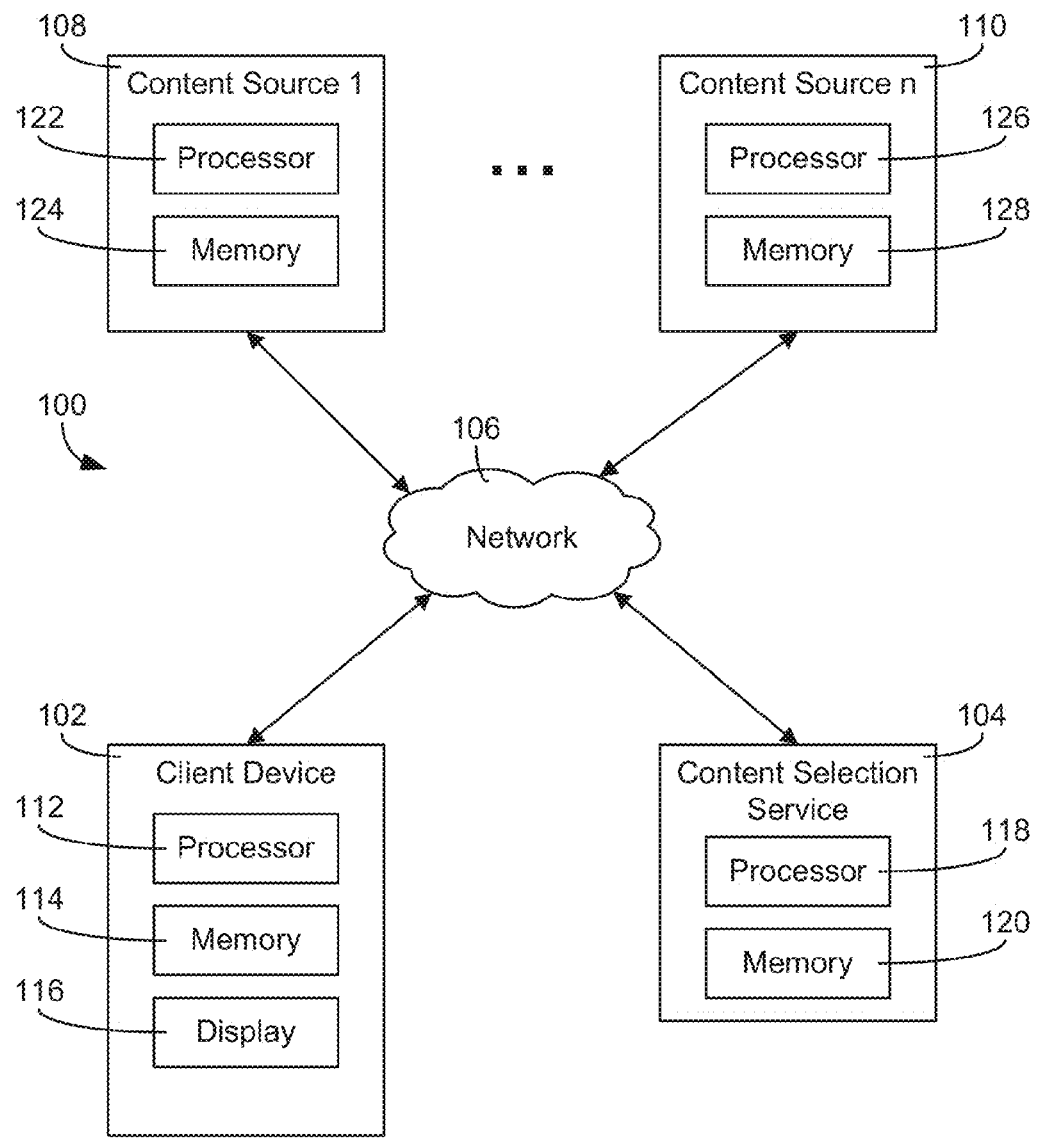
FIG. 1 is a block diagram of an implementation of a computer system in which third-party content is selected for presentation with first-party content.

According to various aspects of the present disclosure, a first-party content provider may allow a content selection service to determine which third-party content is to be provided in conjunction with the first-party provider's content. In exchange for doing so, the first-party content provider may receive a portion of any revenues collected by the content selection service from third-party content providers. For example, a website operator may allow third-party advertisements to be selected by a content selection service for placement on the pages of the website. In turn, the content selection service may charge the third-party content providers that place content on the website a certain amount and apportion a percentage of this amount to the first-party content provider.

Both first-party and third-party content may be optimized based on the location of a device, in various implementations. In one implementation, the device may report its location to a content selection service that uses the device's location to select third-party advertisements or other content for presentation by the device. For example, assume that a user is traveling by the local movie theater. If the user allows the system to use the location of his or her device, the user may be presented with a third-party coupon or other promotion for that particular movie theater. In another implementation, the device may report its location in conjunction with a request for first-party content. For example, the web browser of the device may include information regarding the location of the device when requesting a particular first-party website. This location information may then be used by the website to tailor the first-party content to the location of the device. For example, a retail website may display in-stock information for goods available from its nearest store.

According to various implementations, a number of measures may be taken to ensure the privacy of a user. In some implementations, a web browser may be configured to retrieve a list of one or more trusted online services. The web browser may use this list to control which online services are eligible to receive location information from the device. In one implementation, a list of preapproved online services may be installed with the web browser or received by the browser from a remote location at a later time (e.g., during an update of the browser, when a new list is available, etc.). For example, the manufacturer of the web browser may prescreen online services that wish to receive location information from the web browser. In a further implementation, the web browser may be configured to allow the user to specify which online services are eligible to receive data regarding the location of the device. The web browser may also take additional measures, such as encrypting the location information or lowering the precision of the location prior to transmittal. For example, the web browser may generalize the location of the device to a particular city, zip code, state, etc., instead of providing a more precise location of the device.

Referring to FIG. 1, a block diagram of a computer system 100 in accordance with a described implementation is shown. System 100 includes a client device 102 which communicates with other computing devices via a network 106. Client device 102 may execute a web browser or other application (e.g., a video game, a messenger program, a media player, a social networking application, etc.) to retrieve content from other devices over network 106. For example, client device 102 may communicate with any number of content sources 108, 110 (e.g., a first content source through nth content source). Content sources 108, 110 may provide webpage data and/or other content, such as images, video, and audio, to client device 102. Computer system 100 may also include a content selection service 104 configured to select third-party content to be provided to client device 102. For example, content source 108 may provide a first-party webpage to client device 102 that includes additional third-party content selected by content selection service 104.

Network 106 may be any form of computer network that relays information between client device 102, content sources 108, 110, and content selection service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT5 cable, etc.) to other computing devices in network 106.

Client device 102 may be any number of different types of user electronic devices configured to communicate via network 106 (e.g., a laptop computer, a desktop computer, a tablet computer, a smartphone, a digital video recorder, a set-top box for a television, a video game console, combinations thereof, etc.). In some implementations, the type of client device 102 may be categorized as a mobile device, a desktop device (e.g., a device intended to remain stationary or configured to primarily access network 106 via a local area network), or another category of electronic devices (e.g., tablet devices may be a third category, etc.). Client device 102 is shown to include a processor 112 and a memory 114. Memory 114 may store machine instructions that, when executed by processor 112 cause processor 112 to perform one or more of the operations described herein. Processor 112 may include one or more microprocessors, ASICs, FPGAs, other logic processing devices, or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions.

Client device 102 may include one or more user interface devices. A user interface device may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116, which displays webpages and other data received from content sources 108, 110 and/or content selection service 104. In various implementations, display 116 may be located inside or outside of the same housing as that of processor 112 and/or memory 114. For example, display 116 may be an external display, such as a computer monitor, television set, or any other stand-alone form of electronic display. In other examples, display 116 may be integrated into the housing of a laptop computer, mobile device, or other form of computing device having an integrated display.

Content sources 108, 110 may be one or more electronic devices connected to network 106 that provide content to devices connected to network 106. For example, content sources 108, 110 may be computer servers (e.g., FTP servers, file sharing servers, web servers, etc.) or combinations of servers (e.g., data centers, cloud computing platforms, etc.). Content may include, but is not limited to, webpage data, a text file, a spreadsheet, images, search results, other forms of electronic documents, and applications executable by client device 102. For example, content source 108 may be an online search engine that provides search result data to client device 102 in response to a search query. In another example, content source 110 may be a first-party web server that provides webpage data to client device 102 in response to a request for the webpage. Similar to client device 102, content sources 108, 110 may include processors 122, 126 and memories 124, 128, respectively, that store program instructions executable by processors 122, 126. For example, the processing circuit of content source 108 may include instructions such as web server software, FTP serving software, and other types of software that cause content source 108 to provide content via network 106.

According to various implementations, content sources 108, 110 may provide first-party webpage data to client device 102 that includes one or more content tags. In general, a content tag refers to any piece of webpage code associated with the action of including third-party content with a first-party webpage. For example, a content tag may define a slot on a webpage for third-party content, a slot for out of page third-party content (e.g., an interstitial slot), whether third-party content should be loaded asynchronously or synchronously, whether the loading of third-party content should be disabled on the webpage, whether third-party content that loaded unsuccessfully should be refreshed, the network location of a content source that provides the third-party content (e.g., content sources 108, 110, content selection service 104, etc.), a network location (e.g., a URL) associated with clicking on the third-party content, how the third-party content is to be rendered on a display, a command that causes client device 102 to set a browser cookie (e.g., via a pixel tag that sets a cookie via an image request), one or more keywords used to retrieve the third-party content, and other functions associated with providing third-party content with a first-party webpage. For example, content source 108 may serve first-party webpage data to client device 102 that causes client device 102 to retrieve third-party content from content selection service 104. In another implementation, content may be selected by content selection service 104 and provided by content source 108 as part of the first-party webpage data sent to client device 102. In a further example, content selection service 104 may cause client device 102 to retrieve third-party content from a specified location, such as memory 114 or content sources 108, 110.

Content selection service 104 may also be one or more electronic devices connected to network 106. Content selection service 104 may be a computer server (e.g., FTP servers, file sharing servers, web servers, etc.) or a combination of servers (e.g., a data center, a cloud computing platform, etc.). Content selection service 104 may include a processor 118 and a memory 120 that stores program instructions executable by processor 118. In cases in which content selection service 104 is a combination of computing devices, processor 118 may represent the collective processors of the devices and memory 120 may represent the collective memories of the devices.

Content selection service 104 may be configured to select third-party content for client device 102 (i.e., content selection service 104 may provide a third-party content selection service). In one implementation, the selected third-party content may be provided by content selection service 104 to client device 102 via network 106. For example, content source 110 may upload the third-party content to content selection service 104. Content selection service 104 may then provide the third-party content to client device 102 to be presented in conjunction with first-party content provided by any of content sources 108, 110. In other implementations, content selection service 104 may provide an instruction to client device 102 that causes client device 102 to retrieve the selected third-party content (e.g., from memory 114 of client device 102, from content source 110, etc.). For example, content selection service 104 may select third-party content to be provided as part of a first-party webpage visited by client device 102 or within a first-party application executed by client device 102 (e.g., within a game, messenger application, etc.).

In some implementations, content selection service 104 may be configured to select content based on a device identifier associated with client device 102. In general, a device identifier refers to any form of data that may be used to represent a device or piece of software that receives content selected by content selection service 104. In some implementations, a device identifier may be associated with one or more other device identifiers (e.g., a device identifier for a mobile device, a device identifier for a home computer, etc.). Device identifiers may include, but are not limited to, cookies, device serial numbers, universal device identifier (UDID) values, user profile data, or network addresses. For example, a cookie set on client device 102 may be used to identify client device 102 to content selection service 104. In another example, a UDID associated with a mobile application on client device 102 may be used to identify client device 102 to content selection service 104.

For situations in which the systems discussed herein collect personal information about a user, or may make use of personal information, the user may be provided with an opportunity to control which programs or features collect such information, the types of information that may be collected (e.g., information about a user's social network, social actions or activities, a user's preferences, a user's current location, etc.), and/or how third-party content may be selected by content selection service 104 and presented to the user. Certain data, such as a device identifier, may be anonymized in one or more ways before it is stored or used, so that personally identifiable information is removed when generating parameters (e.g., demographic parameters) used by content selection service 104 to select third-party content. For example, a device identifier for client device 102 may be anonymized so that no personally identifiable information about its corresponding user can be determined by content selection service 104 from it. In another example, a user's geographic location may be generalized where location information is obtained (such as to a city, ZIP code, or state level), so that a precise location of the user cannot be determined. Thus, the user of client device 102 may have control over how information is collected about him or her and used by content selection service 104.

If the user of client device 102 has elected to allow content selection service 104 to use information regarding himself or herself, content selection service 104 may use history data associated with a device identifier to select relevant content for the corresponding user. History data may be any data associated with a device identifier that is indicative of an online event (e.g., visiting a webpage, interacting with presented content, conducting a search, making a purchase, downloading content, etc.). Based in part on the analyzed history data, content selection service 104 may select third-party content to be provided in conjunction with first-party content (e.g., as part of a displayed webpage, as a pop-up, within a video game, within another type of application, etc.). Additional data associated with a device identifier may include, but is not limited to, the device type of client device 102 (e.g., whether client device 102 is a desktop or mobile device), the location of client device 102, or a search query generated by client device 102. For example, content selection service 104 may select third-party content to be provided as part of a first-party webpage or in conjunction with search results from one of content sources 108, 110.

Content selection service 104 may analyze the history data associated with a device identifier to identify one or more topics that may be of interest. For example, content selection service 104 may perform text and/or image analysis on a webpage from content source 108, to determine one or more topics of the webpage. In some implementations, a topic may correspond to a predefined interest category used by content selection service 104. For example, a webpage devoted to the topic of golf may be classified under the interest category of sports. In some cases, interest categories used by content selection service 104 may conform to a taxonomy (e.g., an interest category may be classified as falling under a broader interest category). For example, the interest category of golf may be /Sports/Golf, /Sports/Individual Sports/Golf, or under any other hierarchical category. Similarly, content selection service 104 may analyze the content of a first-party webpage accessed by client device 102 to identify one or more topical categories for the webpage. For example, content selection service 104 may use text or image recognition on the webpage to determine that the webpage is devoted to the topical category of/Sports/Golf.

Content selection service 104 may receive history data indicative of one or more online events associated with a device identifier. In implementations in which a content tag causes client device 102 to request content from content selection service 104, such a request may include a device identifier for client device 102 and/or additional information (e.g., the loaded webpage, the referring webpage, etc.). For example, content selection service 104 may receive and store history data regarding whether or not third-party content provided to client device 102 was selected using an interface device (e.g., the user of client device 102 clicked on a third-party hyperlink, third-party image, etc.). Content selection service 104 may store such data to record a history of online events associated with a device identifier. In some cases, client device 102 may provide history data to content selection service 104 without first executing a content tag. For example, client device 102 may periodically send history data to content selection service 104 or may do so in response to receiving a command from a user interface device. In some implementations, content selection service 104 may receive history data from content sources 108, 110. For example, content source 108 may store history data regarding web transactions with client device 102 and provide the history data to content selection service 104.

Content selection service 104 may apply one or more weightings to an interest or product category, to determine whether the category is to be associated with a device identifier. For example, content selection service 104 may impose a maximum limit to the number of product or interest categories associated with a device identifier. The top n-number of categories having the highest weightings may then be selected by content selection service 104 to be associated with a particular device identifier. A category weighting may be based on, for example, the number of webpages visited by the device identifier regarding the category, when the visits occurred, how often the topic of the category was mentioned on a visited webpage, or any online actions performed by the device identifier regarding the category. For example, topics of more recently visited webpages may receive a higher weighting than webpages that were visited further in the past. Categories may also be subdivided by the time periods in which the webpage visits occurred. For example, the interest or product categories may be subdivided into long-term, short-term, and current categories, based on when the device identifier visited a webpage regarding the category.

Content selection service 104 may be configured to conduct a content auction among third-party content providers to determine which third-party content is to be provided to client device 102. For example, content selection service 104 may conduct a real-time content auction in response to client device 102 requesting first-party content from one of content sources 108, 110 or executing a first-party application. Content selection service 104 may use any number of factors to determine the winner of the auction. For example, the winner of a content auction may be based in part on the third-party provider's bid and/or a quality score for the third-party provider's content (e.g., a measure of how likely the user of client device 102 is to click on the content). In other words, the highest bidder is not necessarily the winner of a content auction conducted by content selection service 104, in some implementations.

Content selection service 104 may be configured to allow third-party content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for the presentation of their content at client device 102. In other words, the bid amount may be on a cost per impression or cost per thousand impressions (CPM) basis. In further cases, a bid amount may correspond to a specified action having been performed in response to the third-party content having been presented at a client device. For example, a bid amount may be a monetary amount that the third-party content provider is willing to pay, should their content be clicked on at the client device, thereby redirecting the client device to the provider's webpage. In other words, a bid amount may be a cost per click (CPC) bid amount. In another example, the bid amount may correspond to an action having been performed on the third-party provider's website, such as the user of client device 102 making a purchase.

A campaign created via content selection service 104 may also include selection parameters that control when a bid is placed on behalf of a third-party content provider in a content auction. If the third-party content is to be presented in conjunction with search results from a search engine, for example, the selection parameters may include one or more sets of search keywords. For example, the third-party content provider may only participate in content auctions in which a search query for "golf resorts in California" is sent to a search engine. Other example parameters that control when a bid is placed on behalf of a third-party content provider may include, but are not limited to, a topic identified using a device identifier's history data (e.g., based on webpages visited by the device identifier), the topic of a webpage or other first-party content with which the third-party content is to be presented, a geographic location of the client device that will be presenting the content, or a geographic location specified as part of a search query. In some cases, a selection parameter may designate a specific webpage, website, or group of websites with which the third-party content is to be presented. For example, an advertiser selling golf equipment may specify that they wish to place an advertisement on the sports page of an particular online newspaper.

According to various implementations, third-party content selected by content selection service 104 and/or first-party content from any of content sources 108-110 may be optimized based on the location of client device 102. For example, content selection service 104 may use the location of client device 102 to select an advertisement for a business that is located near client device 102. In another example, a first-party webpage from content source 108 may be tailored to the location of client device 102, such as including local specials on the webpage, selecting a language for the webpage, applying a location filter to a search mechanism on the webpage (e.g., listing merchandise that is in-stock at a local store), etc.

In some implementations, a web browser of client device 102 may be configured to report the location of client device 102 when requesting content from any of content sources 108-110 or from content selection service 104. In one implementation, the base web browser itself may be configured to report the location of client device 102 in conjunction with a content request. In other words, the web browser may report the location of client device 102 without having first executed any webpage code that would otherwise cause the web browser to report the location of client device 102. For example, the web browser may report the location of client device 102 to content source 108 in conjunction with the first content request sent by the browser after client device 102 is rebooted.

The web browser of client device 102 may be configured to utilize a whitelist of one or more content sources, to determine whether or not the location of client device 102 is to be reported. For example, client device 102 may report its location to content source 108 but not to content source 110, based on the contents of the whitelist. In various implementations, the whitelist may include an online content source that is added manually by the user of client device 102, an online content source that has been preapproved to receive location information (e.g., by the manufacturer of the browser, etc.), or a preapproved content source that has been validated by the user of client device 102. For example, an online content source that wants to receive location information from devices running the browser may be required by the manufacturer of the browser to submit information regarding how the content source will use the location information, how the content source stores the information, for how long the content source intends to retain the location information, etc. Based on the submitted data from the content source, the manufacturer may approve the web browser sending location information to the content source. In some cases, the web browser may only report location information to preapproved online sources after presenting the list of preapproved online sources to the user of client device 102. For example, the web browser may display a listing of preapproved online sources, details regarding how the sources use the location information, and/or options to allow or disallow the sending of location information to a particular online source. In other words, the web browser may be configured to allow the user of client device 102 to select which of the preapproved online sources are actually able to receive reported location information from client device 102.

Figure 2:
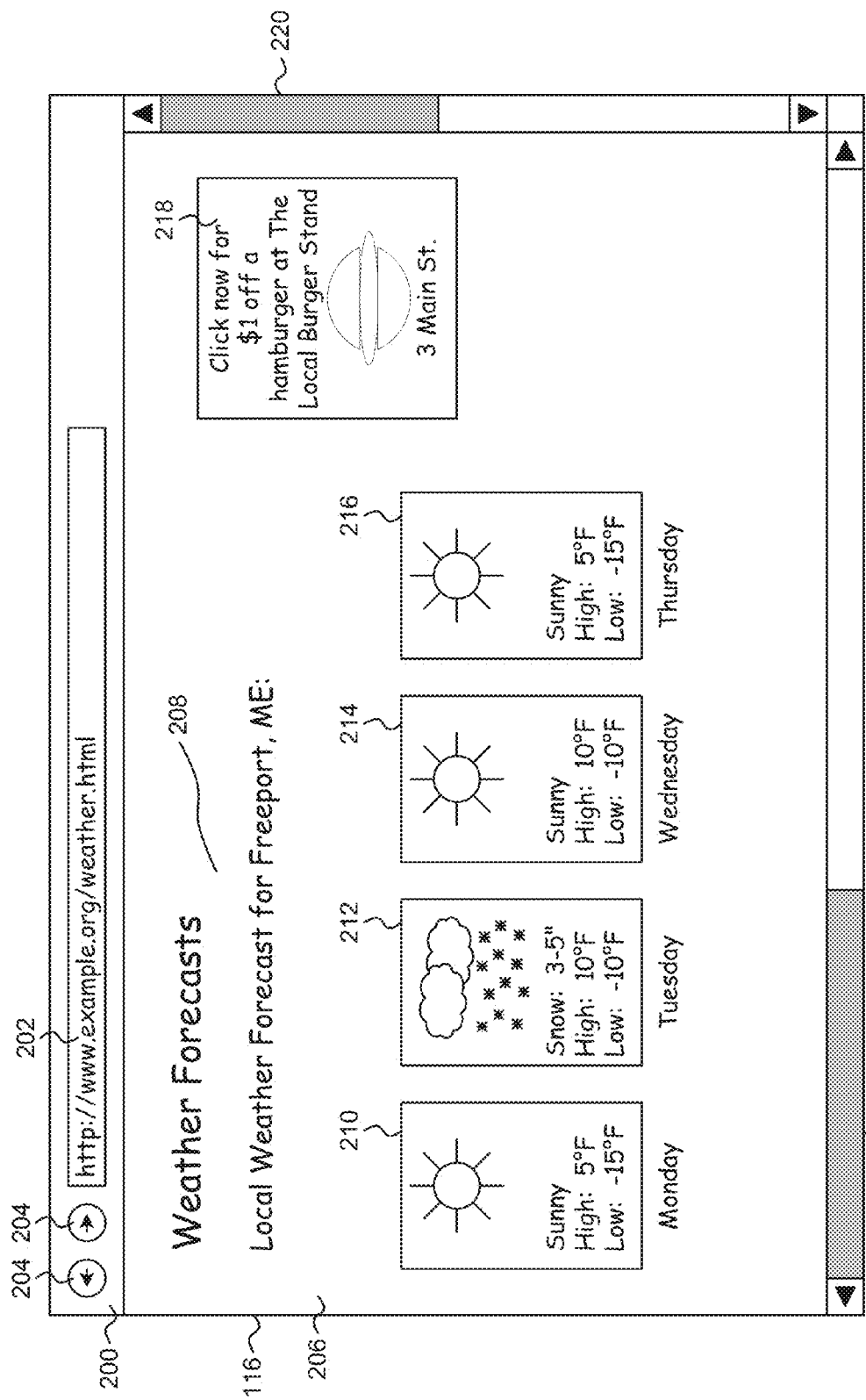
FIG. 2 is an example illustration of an implementation of an electronic display showing a first-party webpage with embedded third-party content.

Referring now to FIG. 2, an illustration is shown of electronic display 116 displaying an example first-party webpage 206. Electronic display 116 is in electronic communication with processor 112 which causes visual indicia to be displayed on electronic display 116. As shown, processor 112 may execute a web browser 200 stored in memory 114 of client device 102, to display indicia of content received by client device 102 via network 106. In other implementations, another application executed by client device 102 may incorporate some or all of the functionality described with regard to web browser 200 (e.g., a video game, a chat application, etc. may also function as a web browser).

Web browser 200 may operate by receiving input of a uniform resource locator (URL) via a field 202 from an input device (e.g., a pointing device, a keyboard, a touch screen, etc.). For example, the URL, http://www.example.org/weather.html, may be entered into field 202. Processor 112 may use the inputted URL to request data from a content source having a network address that corresponds to the entered URL. In other words, client device 102 may request first-party content accessible at the inputted URL. In response to the request, the content source may return webpage data and/or other data to client device 102. Web browser 200 may analyze the returned data and cause visual indicia to be displayed by electronic display 116 based on the data.

In general, webpage data may include text, hyperlinks, layout information, and other data that may be used to provide the framework for the visual layout of first-party webpage 206. In some implementations, webpage data may be one or more files of webpage code written in a markup language, such as the hypertext markup language (HTML), extensible HTML (XHTML), extensible markup language (XML), or any other markup language. For example, the webpage data in FIG. 2 may include a file, "weather.html" provided by the website, "www.example.org." The webpage data may include data that specifies where indicia appear on first-party webpage 206, such as text 208. In some implementations, the webpage data may also include additional URL information used by web browser 200 to retrieve additional indicia displayed on first-party webpage 206. For example, the file, "weather.html," may also include one or more instructions used by processor 112 to retrieve images 210-216 from their respective content sources.

Web browser 200 may include a number of navigational controls associated with first-party webpage 206. For example, web browser 200 may be configured to navigate forward and backwards between webpages in response to receiving commands via inputs 204 (e.g., a back button, a forward button, etc.). Web browser 200 may also include one or more scroll bars 220, which can be used to display parts of first-party webpage 206 that are currently off-screen. For example, first-party webpage 206 may be formatted to be larger than the screen of electronic display 116. In such a case, the one or more scroll bars 220 may be used to change the vertical and/or horizontal position of first-party webpage 206 on electronic display 116.

First-party webpage 206 may be devoted to one or more topics. For example, first-party webpage 206 may be devoted to the local weather forecast for Freeport, Me. In some implementations, a content selection server, such as content selection service 104, may analyze the contents of first-party webpage 206 to identify one or more topics. For example, content selection service 104 may analyze text 208 and/or images 210-216 to identify first-party webpage 206 as devoted to weather forecasts. In some implementations, webpage data for first-party webpage 206 may include metadata that identifies a topic.

In some implementations, web browser 200 may be configured to determine and report the location of client device 102 in conjunction with the content request for first-party webpage 206. For example, web browser 200 may include the location of client device 102 in the header of the HTTP request sent to the content source associated with the address http://www.example.org/weather.html. In response, the content source may use the received location information to tailor the content of webpage 206 to the location of client device 102. For example, assume that client device 102 is currently located in Freeport, Me. If so, the provider of webpage 206 may use the location of client device 102 to include the weather report for Freeport, Me. on webpage 206.

In various implementations, content selection service 104 may select some of the content presented on first-party webpage 206 (e.g., an embedded image or video, etc.) or in conjunction with first-party webpage 206 (e.g., in a pop-up window or tab, etc.). For example, content selection service 104 may select third-party content 218 to be included on webpage 206. In some implementations, one or more content tags may be embedded into the code of webpage 206 that defines a content field located at the position of third-party content 218. Another content tag may cause web browser 200 to request additional content from content selection service 104, when first-party webpage 206 is loaded. In other words, the code for webpage 206 may include an instruction that causes web browser 200 to request third-party content from content selection service 104. In conjunction with this request, web browser 200 may include the location of client device 102 (e.g., in the header of the HTTP request, etc.). In some cases, web browser 200 may report the location of client device 102 to content selection service 104 regardless of whether or not a content tag on webpage 206 includes an instruction to do so (i.e., web browser 200 may itself be configured to report location information in conjunction with a content request).

Content selection service 104 may use location information received from web browser 200 to select third-party content 218 for presentation with webpage 206. For example, assume that client device 102 is located on Main Street in Freeport, Me. and is near the restaurant, "The Local Burger Stand." Using the location information, content selection service 104 may select an advertisement for the restaurant that includes a promotion, coupon, or the like. In some implementations, third-party content 218 may be interactive content that causes client device 102 to perform operations when third-party content 218 is clicked or otherwise selected using an interface device. For example, clicking on third-party content 218 may cause web browser 200 to navigate to the website of The Local Burger Stand, to launch a navigation program that directs the user to the nearest restaurant location, to play a video, or perform other operations.

Figure 3:
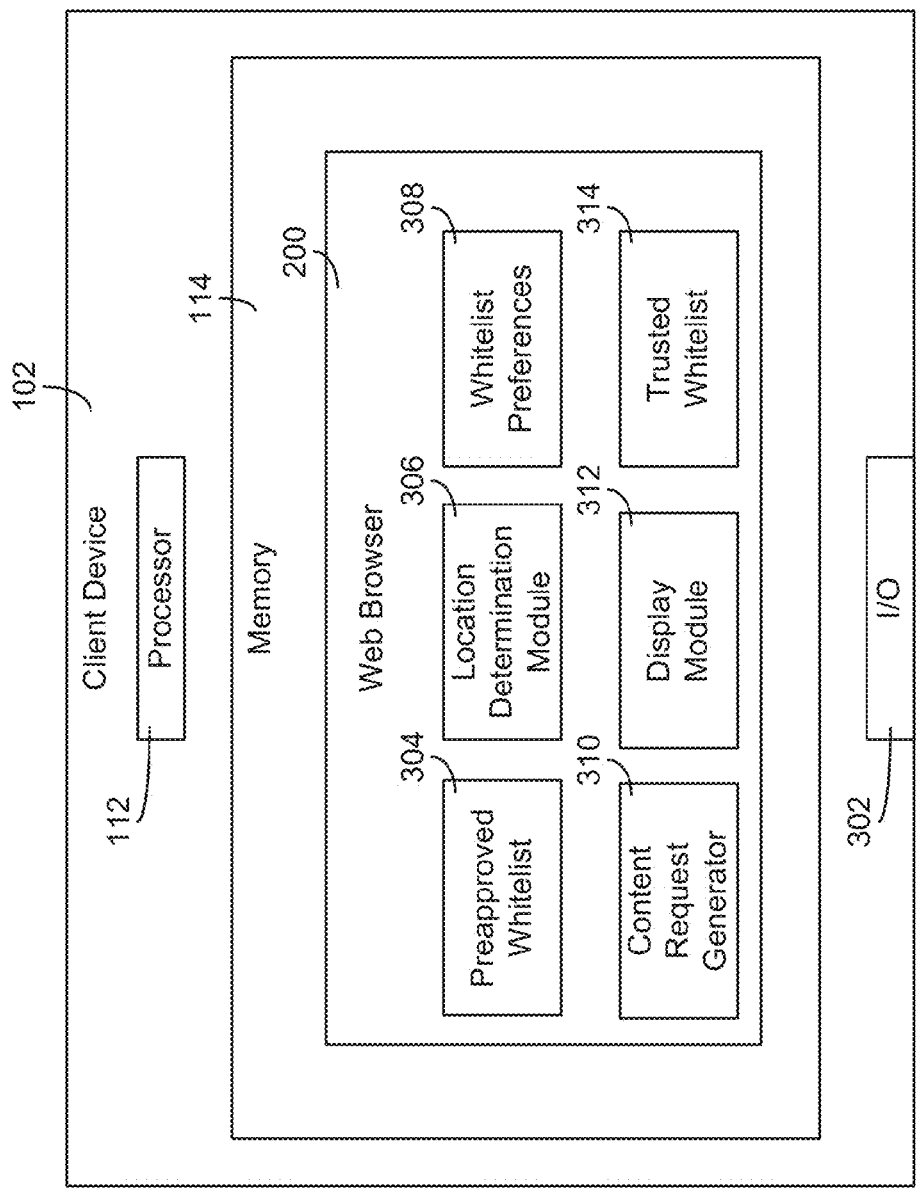
FIG. 3 is a detailed block diagram of the client device of FIG. 1, according to various implementations.

Referring now to FIG. 3, a detailed block diagram of the client device 102 of FIG. 1 is shown, according to various implementations. As shown, client device 102 may include a number of hardware components in electronic communication with one another. For example, client device 102 may include input and/or output (I/O) hardware 302 in electronic communication with processor 112 that is configured to receive data from another computing device (e.g., requested first or third-party content, a list of preapproved online services, etc.) and/or provide data to another computing device (e.g., a request for content, location data, etc.) via network 106. Client device 102 may also include various software modules in memory 114 that, when executed by processor 112, cause processor 112 to perform the functions described herein.

Memory 114 may include the web browser 200 depicted in FIG. 2. In various implementations, web browser 200 may be configured to request content from online content sources and display the requested content. Web browser 200 may simply be a web browser, in one implementation, or may be another application that includes the functionality to navigate between webpages, in other implementations. For example, an email program may include web browsing functionality, in some cases. Web browser 200 may include and/or use any number of software modules to perform the functions described herein. As shown, web browser 200 may include, but is not limited to, a location determination module 306, a content request generator 310, and/or a display module 312.

As shown, web browser 200 may include a preapproved whitelist 304 containing a list of one or more content sources. The one or more content sources included in preapproved whitelist 304 may be preapproved by the manufacturer of web browser 200 or another certifying entity. In some cases, a content source that wants to receive and use location information from web browser 200 may first submit a request to the manufacturer or certifying entity for the ability to do so. The request may include various information such as the data retention policy of the content source (e.g., to ensure that the received location is not retained for any length of time), how the location information is used by the content source (e.g., for purposes of advertising, for purposes of tailoring content to the location of the client device, etc.), security measures taken by the content source to protect the location information (e.g., whether or not the content source uses encryption, etc.), or any other information regarding the use of location information by the content source. In one implementation, the certifying entity may also verify that the answers supplied by the content source are accurate. For example, the certifying entity may verify that a content source does not use the received location information for a different purpose than the one stated. If so, the content source may be removed from future whitelists.

Web browser 200 may receive preapproved whitelist 304 from another device via network 106. For example, preapproved whitelist 304 may be updated automatically (e.g., whenever a new preapproved whitelist is available, after a periodic amount of time has elapsed, etc.) or in response to a user request to refresh the list. In one implementation, preapproved whitelist 304 may be included as part of the installation of web browser 200. For example, an installer executed by client device 102 may transfer preapproved whitelist 304 into memory 114.

Web browser 200 may also include whitelist preferences 308. In various implementations, web browser 200 may be configured to allow the user of client device 102 to control how web browser 200 reports location information. For example, whitelist preferences 308 may include one or more parameters that control whether or not web browser 200 reports location information at all. In another example, web browser 200 may present preapproved whitelist 304 to the user as part of a preferences setup. Such a preferences screen may include any information included in preapproved whitelist 304, such as the identity of an online service and/or how the service will use the location information. The preferences screen may also be configured to allow the user to specify which of the content sources in preapproved whitelist 304 are eligible to receive location information from web browser 200. In some cases, the preference screen may be configured to allow the user of client device 102 to specify a content source that is not in preapproved whitelist 304. If a new preapproved whitelist is received by web browser 200, the user of client device 102 may be prompted to review the changes between the current preapproved list and the new list (e.g., to select whether or not any new content sources are to be included in trusted whitelist 314) and/or to revalidate each content source already in trusted whitelist 314.

Web browser 200 may combine any of whitelist preferences 308 (e.g., parameters specified by the user of client device 102) and preapproved whitelist 304 (e.g., those online sources that have been preapproved by a certification service) to form a trusted whitelist 314. Trusted whitelist 314 generally includes a listing of any online services eligible to receive location information from web browser 200. For example, web browser 200 may include the location of client device 102 with any request for content from a content source included in trusted whitelist 314.

In one implementation, web browser 200 may include a location determination module 306. Location determination module 306 is generally configured to determine the location of client device 102. In various implementations, location determination module 306 may base its determination on data from a satellite receiver in client device 102 (e.g., a GPS or other receiver), using triangulation data from a transceiver (e.g., using cellular triangulation from a cellular receiver), or any other hardware circuitry of client device 102 that is configured to identify the geographic location of client device 102 (e.g., based on a WiFi hotspot accessed by the device). In some implementations, location determination module 306 determines the location of client device 102 directly. For example, location determination module 306 may directly interface with a local GPS receiver to determine the location of client device 102. In other implementations, location determination module 306 may determine the location of client device 102 indirectly via other software executed by client device 102. For example, assume that client device 102 also executes a navigation program in addition to web browser 200. In such a case, location determination module 306 may access the location information from the navigation program via an application programming interface (API).

In some cases, the level of precision of the location determined by location determination module 306 may be lowered by location determination module 306. For example, assume that the determined location corresponds to a street address having a radius of error of ten feet. In such a case, location determination module 306 may lower the precision of the location by increasing the radius of error around the address or replacing the determined location with a larger geographic area, such as an entire city block, a city, a state, a country, a time zone, a zip code, an area code, or the like. In other cases, the content source that receives the determined location may instead lower the precision level prior to using the location information.

Web browser 200 may include a content request generator 310. In response to receiving an instruction to access online content from an online content source, content request generator 310 may provide a content request via network 106 to the content source. In some cases, content request generator 310 may receive the instruction from a user interface device of client device 102. For example, the user of web browser 200 may enter a URL into the browser and initiate the content request. In other cases, content request generator 310 may receive the instruction from webpage code. For example, a content tag of a webpage accessed by web browser 200 may be an instruction that causes content request generator 310 to generate and send a content request for third-party content (e.g., from content selection service 104) when executed by web browser 200.

According to various implementations, content request generator 310 may compare the content source associated with a content request to trusted whitelist 314. If the content source is included in trusted whitelist 314, content request generator 310 may provide the location determined by location determination module 306 in conjunction with the request. In one implementation, content request generator 310 may include the location information in the HTTP request itself, such as in the header of the HTTP request. In another implementation, content request generator 310 may send the location as a separate transmission as the content request. Both transmissions may include the same or linked device identifiers, allowing the receiving content source to associate the two transmissions. For example, content request generator 310 may send a first message to content selection service 104 that includes the location of client device 102 and a cookie that identifies client device 102. Immediately after the transmission, content request generator 310 may send a second request for content that includes the same cookie and any other information that may be used by content selection service 104 to select third-party content (e.g., the size of the content slot, a topic, etc.).

In one implementation, content request generator 310 may be configured to apply the permissions of a first-party content source in trusted whitelist 314 to any third-party content presented in conjunction with the first-party content. For example, assume that the user of client device 102 has elected to allow a particular news website to receive location information from web browser 200. If so, content request generator 310 may also include the location information with any requests for third-party content that will be presented in conjunction with the news website. This functionality may be controlled, in some cases, by a parameter value set in whitelist preferences 308 (e.g., web browser 200 may be restricted to sharing its location with only those content sources in trusted whitelist 314 or may be allowed to propagate a content source's permissions to any third-party content as well).

Content request generator 310 may be configured to utilize any number of techniques to ensure the security of any sent location information. In some implementations, content request generator 310 may encrypt the location information from location determination module 306 prior to transmittal. For example, the location information may be sent via a secure protocol, such as HTTPS. In another example, web browser 200 and the receiving content source may utilize public key cryptography to ensure that access to the location information is only accessible by the receiving content source. Such keys may be shared between web browser 200 and the content source via the certifying service that provides preapproved whitelist 304 to web browser 200 or directly between one another, in various cases.

Web browser 200 may include a display module 312. Display module 312 is configured to present any content received by web browser 200 in response to a content request on one or more electronic displays. For example, display module 312 may interpret webpage data received by web browser 200 in response to sending a content request and send the display data via I/O hardware 302 to display 116. In some cases, display module 312 may provide one or more configuration screens for web browser 200 to the display. For example, display module 312 may provide a configuration screen to the display that allows the user to review preapproved whitelist 304 and enter whitelist preferences 308, to generate trusted whitelist 314.

Figure 4:
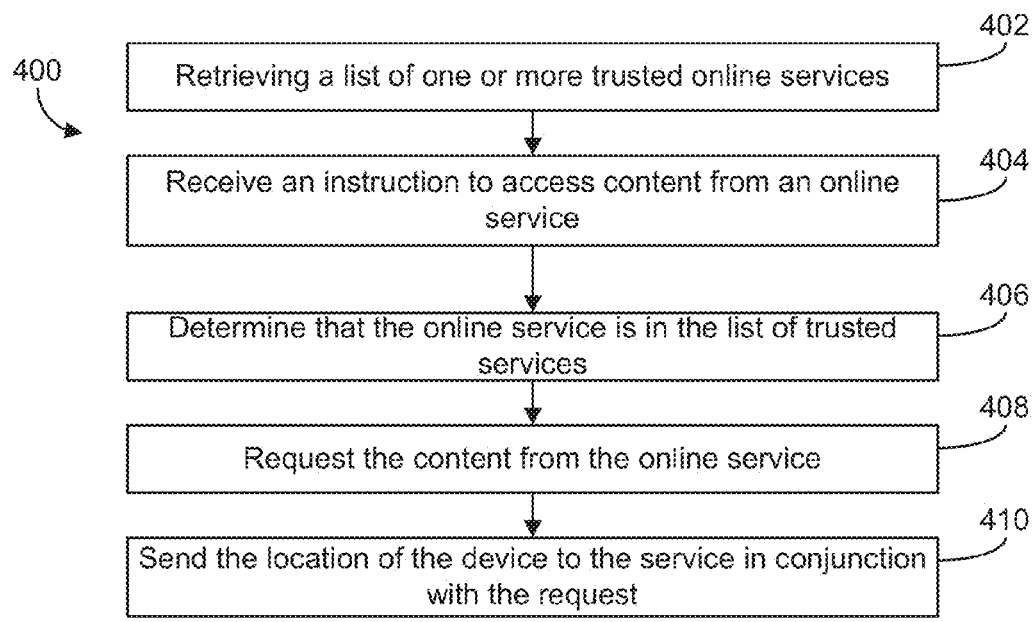
FIG. 4 is a flow diagram of the steps taken in one implementation of a process for accessing location-based content.

Referring now to FIG. 4, a flow diagram of a process 400 for accessing location-based content is shown, according to various implementations. Process 400 generally includes retrieving a list of one or more trusted online services (step 402), receiving an instruction to access content from an online service (step 404), determining that the online service is in the list of trusted services (step 406), requesting the content from the online service (step 408), and sending the location of the device to the service in conjunction with the request (step 410). Process 400 may be implemented by one or more computing devices executing stored machine instructions. For example, process 400 may be implemented by client device 102 shown in detail in FIG. 3. In general, process 400 allows a web browser to access location-based content via the initial request for the content (e.g., without the browser having to first execute webpage code that causes the browser to report the location of the device). Process 400 also ensures a user's privacy in that the user may control which online services, if any, are eligible to receive the location of the device directly from the web browser in conjunction with a request for content.

Referring still to FIG. 4 and in more detail, process 400 includes retrieving a list of one or more trusted online services (step 402). In various implementations, a web browser, such as web browser 200 shown in FIG. 3, may store and retrieve a list of one or more trusted online services that have been whitelisted and are eligible to receive location information from the web browser. For example, web browser 200 may retrieve a trusted whitelist from memory that includes content selection service 104 or any of content sources 108-110. In some implementations, the list of one or more trusted online services may be generated based in part on a list of preapproved online services. For example, the manufacturer of the web browser or another certifying entity may prescreen online services that are eligible to receive location information directly from the browser. In one implementation, the web browser may be configured to allow the user of the web browser to select among the preapproved services to generate the finalized list of trusted online services. In one implementation, one or more of the trusted services in the trusted list may be specified by the user of the web browser directly (e.g., by adding a service to the list that was not preapproved).

Still referring to FIG. 4, process 400 includes receiving an instruction to access content from an online service (step 404). The content may be first or third-party content, in various cases. In one implementation, the web browser may receive the instruction via a user input device, such as a keyboard, touch screen, pointing device, or the like. For example, the web browser may receive an instruction to access content when a user enters a URL into the web browser to navigate to a particular webpage. In another example, the web browser may receive the instruction when the user selects a stored bookmark. In another implementation, the instruction to access content may correspond to web page code executed by the web browser. For example, a first-party webpage accessed by the browser may include a content tag (e.g., a script or other piece of code) that, when executed by the web browser, causes the web browser to request third-party content. In yet another implementation, the instruction may correspond to an embedded webpage script (e.g., a JavaScript) that queries the web browser for a trusted online service. If the service is in the list of the browser's trusted services, the script may redirect the web browser to the corresponding address of the service.

Yet still referring to FIG. 4, process 400 includes the step of determining that the online service is in the list of trusted services (step 406). For example, content request generator 310 of web browser 200 shown in FIG. 3 may compare the online service from the instruction to the list of one or more trusted online services. If a match occurs, the online service may be eligible to receive the location of the device in conjunction with the request for the content. In some implementations, the comparison may be performed on a per URL basis. For example, the web browser may determine that a match exists only if the specific URL from the instruction matches a specific URL in the list of trusted services. In other implementations, a match may be determined if a top level domain or higher level URL that is part of the requested URL is in the list of trusted services. In a further implementation, a match may be determined based on the permissions associated with first-party content that caused the instruction to be generated. For example, assume that the web browser accesses a first-party webpage that is in the list of trusted services and that the code for the webpage includes a content tag that causes the web browser to request third-party content from a content selection service. If the first-party webpage is provided by a service that is in the list of trusted services, its permissions may be inherited by the content selection service as well, in some implementations.

Still referring to FIG. 4, process 400 includes requesting the content from the online service (step 408). In response to the instruction from step 404, the web browser may generate a corresponding content request and send the request to the online service. For example, content request generator 310 of web browser 200 shown in FIG. 3 may generate and send a request for first-party content or third-party content from a content selection service or another online content source.

Yet referring to FIG. 4, process 400 includes sending the location of the device to the service in conjunction with the content request (step 410). In various implementations, if the online service is determined to be trusted in step 406, the location of the device may be sent to the service in conjunction with the content request. In other words, the location of the device may be sent with the initial request for the content directly from the web browser itself. The web browser may include the location information in the content request, such as in a header of the request, in some cases. In other cases, the web browser may send the location information as a separate transmission at a time that is close to the time the content request was sent (e.g., within a few seconds before or after the sending of the content request) or may be sent concurrently with the content request. The sent location information may also be encrypted and/or its precision lowered, in some implementations.

The location information received by a content source in conjunction with a content request may be used to tailor content to the location of the device. For example, an advertisement for a local business may be selected for presentation by the device based on the location of the device. In other cases, a first-party webpage may be optimized to the location of the device. For example, a retail website may use the location information to provide sales, promotions, in-stock information, or the like for the retail store closes to the device as part of the first-party webpage.

Figure 5:
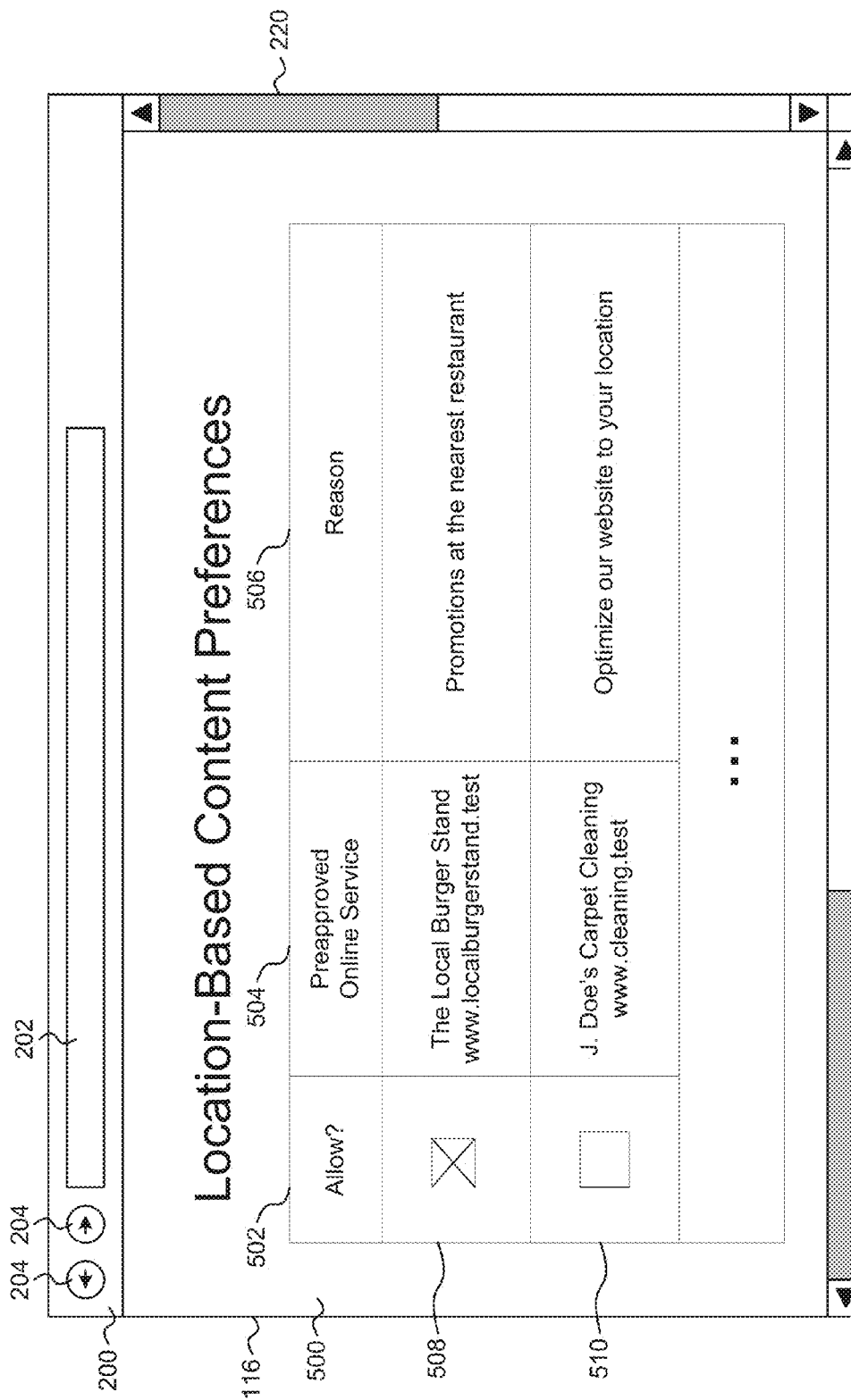
FIG. 5 is an illustration of one implementation of a preferences screen of a web browser.

Referring now to FIG. 5, an illustration of an implementation of a preferences screen of a web browser is shown. As shown, the web browser 200 of FIGS. 2-3 may include a preferences screen 500. Preferences screen 500 may be configured to allow the user of client device 102 to review the online services that have been preapproved to receive location information from web browser 200. In addition, preferences screen 500 may be configured to receive input from the user regarding whether or not the user wants to actually send location information to the preapproved online services.

Preferences screen 500 may include a table, grid, or any other graphical structure that presents information to the user regarding the preapproved online services. For example, a table of preferences screen 500 may include a first column 502 which is configured to receive input regarding whether or not the online service is allowed to receive location information from web browser 200. For example, column 502 may include input mechanisms such as radio buttons, checkboxes, or the like that are configured to receive indications regarding whether or not the user wishes to send location information to the corresponding online service. The table may also include a column 504 that identifies each preapproved online service. In addition, the table may include a column 506 that lists the reason or reasons the online service wants the location of the device. Such reasons may be provided by an online service as part of the preapproval process.

In the example shown, assume that the list of preapproved online services includes a first online service listed in row 508 and a second online service listed in row 510. Row 508 may identify the name of the online service (e.g., "The Local Burger Stand") and may also include the domain name or other URL of the service (e.g., www.localburgerstand.test). Row 508 may also include the reason the service wants the location information, such as to provide promotions to the device for the nearest restaurant. Row 510 may identify a different online service, such as "J. Doe's Carpet Cleaning," its corresponding network address (e.g., www.cleaning.test), or how the service will use the location information (e.g., to optimize its website to the location of the device). Also as shown in the example, assume that the user of web browser 200 has selected the checkbox of row 508 or has deselected the checkbox of row 510. In either case, the user has specified that only the online service in row 508 should be eligible to receive the location of the device. If the preferences specified via screen 500 are then saved, web browser 200 may generate a list of trusted online services that includes the service listed in row 508, but not the service listed in row 510.

In one implementation, preferences screen 500 may include additional inputs (not shown) that are configured to allow the user of web browser 200 to specify an online service that has not been preapproved. In another implementation, preferences screen 500 may include a parameter that allows the user to prevent the sharing of location information with any online service. In yet a further implementation, preferences screen 500 may include parameters that control how the location information is sent, the content of the location information (e.g., whether or not the original precision level should be used), or any other parameter that controls the functionality described herein with respect to web browser 200.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of accessing location-based content comprising:
    retrieving, by a web browser executing on a client device, a list of one or more trusted online services from a memory of the client device;
    receiving an instruction to access content available from an online service;
    determining, by the web browser executing on the client device, that the online service associated with the instruction is in the list of one or more trusted online services;
    requesting, by the web browser, the content from the online service; and
    sending, by the web browser, a location of client device to the online service in conjunction with the request for the content.

2. The method of claim 1, further comprising:
    encrypting the location of the client device prior to sending the location to the online service.

3. The method of claim 1, further comprising:
    lowering the precision of the location of the client device prior to sending the location to the online service.

4. The method of claim 1, further comprising:
    receiving, at the web browser, a list of online services that have been preapproved as trustworthy;
    providing the list of preapproved online services for display by the client device;
    receiving, via a user interface device, a selection of one or more online services from the displayed list of preapproved online services; and
    storing the selected one or more preapproved online services in the list of one or more trusted online services.

5. The method of claim 4, further comprising:
    providing a reason that a preapproved online service needs the location of the client device for display with the list of preapproved online services.

6. The method of claim 1, wherein receiving an instruction to access content available from an online service comprises:
    executing a content tag embedded in a webpage configured to cause the web browser to request third-party content from the online service.

7. The method of claim 1, wherein sending the location of the client device to the online service comprises:
    embedding, by the web browser, the location of the client device into the request for the content from the online service.

8. A system for accessing location-based content comprising one or more processors operable to:

retrieve, by a web browser executing on a client device, a list of one or more trusted online services from a memory of the client device;

receive an instruction to access content available from an online service;

determine, by the web browser executing on the client device, that the online service associated with the instruction is in the list of one or more trusted online services;

request, by the web browser, the content from the online service; and send, by the web browser, a location of the client device to the online service in conjunction with the request for the content.

9. The system of claim 8, wherein the one or more processors are operable to:

encrypt the location of the client device prior to sending the location to the online service.

10. The system of claim 8, wherein the one or more processors are operable to:

lower the precision of the location of the client device prior to sending the location to the online service.

11. The system of claim 8, wherein the one or more processors are operable to:

receive, at the web browser, a list of online services that have been preapproved as trustworthy;

provide the list of preapproved online services for display by the client device;

receive, via a user interface device, a selection of one or more online services from the displayed list of preapproved online services; and store the selected one or more preapproved online services in the list of one or more trusted online services.

12. The system of claim 11, wherein the one or more processors are operable to:

provide a reason that a preapproved online service needs the location of the client device for display with the list of preapproved online services.

13. The system of claim 8, wherein the one or more processors are operable to receive an instruction to access content available from an online service by executing a content tag embedded in a webpage configured to cause the web browser to request third-party content from the online service.

14. The system of claim 8, wherein the one or more processors are operable to send the location of the client device to the online service by embedding, by the web browser, the location of client device into the request for the content from the online service.

15. A computer-readable memory having machine instructions stored therein that are executable by a processor to cause the processor to perform operations comprising:

retrieving, by a web browser executing on a client device, a list of one or more trusted online services from a memory of a client device;

receiving an instruction to access content available from an online service;

determining, by the web browser executing on the client device, that the online service associated with the instruction is in the list of one or more trusted online services;

requesting, by the web browser, the content from the online service; and sending, by the web browser, a location of the client device to the online service in conjunction with the request for the content.

16. The computer-readable memory of claim 15, wherein the operations further comprise:

encrypting the location of the client device prior to sending the location to the online service.

17. The computer-readable memory of claim 15, wherein the operations further comprise:

encrypting the location of the client device prior to sending the location to the online service;

lowering the precision of the location of the client device prior to sending the location to the online service.

18. The computer-readable memory of claim 15, wherein the operations further comprise:

receiving, at the web browser, a list of online services that have been preapproved as trustworthy;

providing the list of preapproved online services for display by the client device;

receiving, via a user interface device, a selection of one or more online services from the displayed list of preapproved online services; and storing the selected one or more preapproved online services in the list of one or more trusted online services.

19. The computer-readable memory of claim 18, wherein the operations further comprise:

providing a reason that a preapproved online service needs the location of the client device for display with the list of preapproved online services.

20. The computer-readable memory of claim 15, wherein receiving an instruction to access content available from an online service comprises:

executing a content tag embedded in a webpage configured to cause the web browser to request third-party content from the online service.

\* \* \* \* \*